United States Patent [19]

Vanfleet et al.

[11] 4,070,827
[45] Jan. 31, 1978

[54] METHOD AND APPARATUS FOR LIMITING INGESTION OF DEBRIS INTO THE INLET OF A GAS TURBINE ENGINE

[75] Inventors: Charles R. Vanfleet; William C. Ruehr, both of Cincinnati, Ohio

[73] Assignee: General Electric Company, Cincinnati, Ohio

[21] Appl. No.: 682,195

[22] Filed: May 3, 1976

[51] Int. Cl.² .............................................. F02C 7/04
[52] U.S. Cl. ................................. 60/204; 60/226 R; 60/39.09 P; 415/121 G; 55/306
[58] Field of Search ............. 60/39.09 P, 204, 226 R; 137/15.1, 15.2; 55/306; 244/53 B; 415/121 G

[56] References Cited
U.S. PATENT DOCUMENTS

| | | | |
|---|---|---|---|
| 2,915,262 | 12/1959 | Klein | 60/39.09 P |
| 3,527,430 | 9/1970 | Smith | 60/39.09 P |
| 3,599,429 | 8/1971 | Bigells et al. | 60/39.09 P |

FOREIGN PATENT DOCUMENTS 1,203,963  1/1977  United Kingdom ............ 60/39.09 P Primary Examiner—Carlton R. Croyle
Assistant Examiner—L. J. Casaregola
Attorney, Agent, or Firm—Henry J. Policinski; Derek P. Lawrence

[57] ABSTRACT

A method and apparatus are disclosed for limiting ingestion of debris into the inlet of a gas turbine engine. The invention includes providing first means in communication with a source of fluid under pressure for introducing at least one jet of fluid at a point aft of the leading edge of a nacelle associated with the engine inlet. The first means are adapted to discharge the fluid jet away from the leading edge and in the aft direction to establish a low pressure region aft of the leading edge and in sufficient proximity to a second vortex formation region so as to draw airflows from the second region into the low pressure region and away from the engine inlet.

12 Claims, 6 Drawing Figures

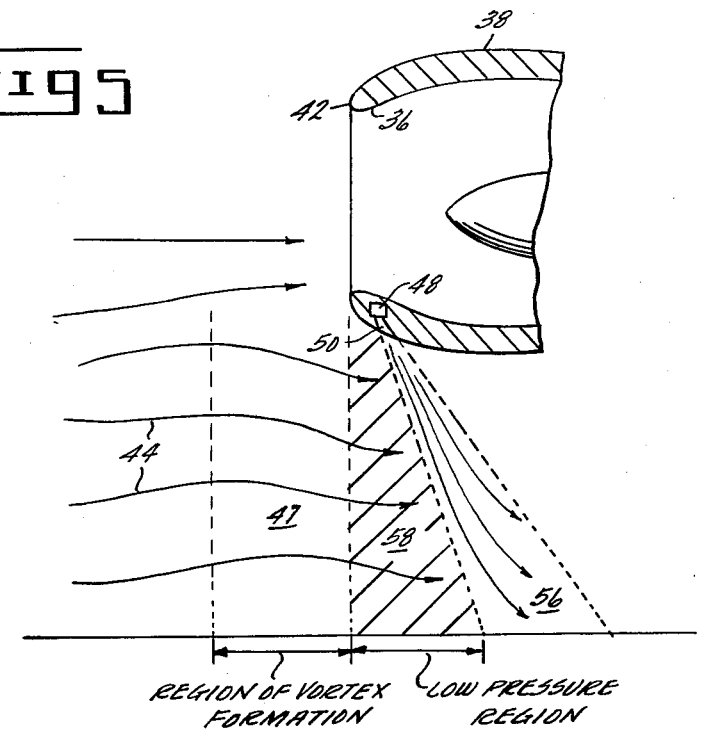
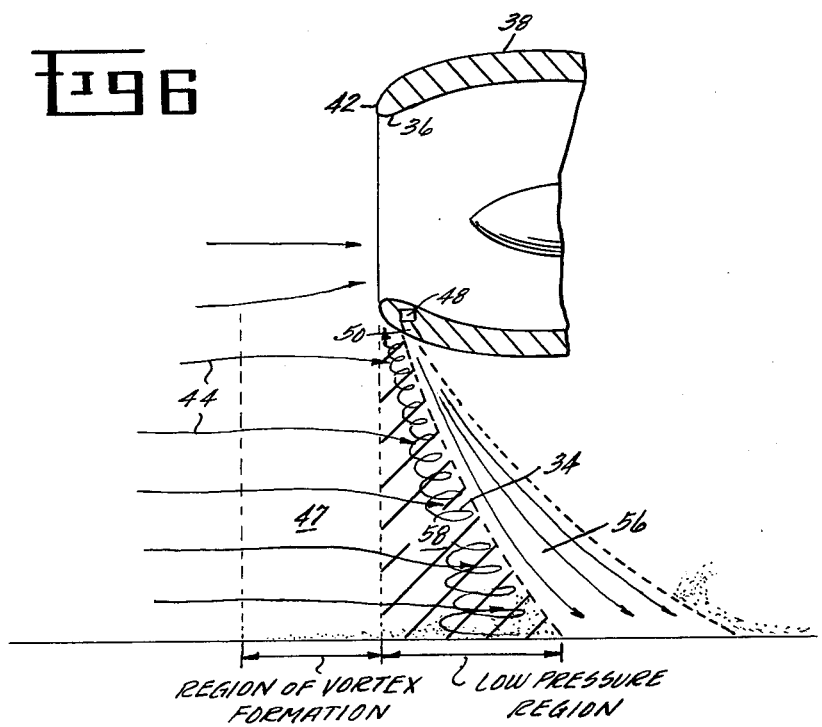

METHOD AND APPARATUS FOR LIMITING INGESTION OF DEBRIS INTO THE INLET OF A GAS TURBINE ENGINE

BACKGROUND OF THE INVENTION

This invention relates to internal combustion engines, particularly gas turbine engines associated with aircraft propulsion. More specifically, the invention relates to a method and apparatus for limiting ingestion of ground debris into the inlet of such engines.

Internal combustion engines such as a gas turbine engine generally require large quantities of air flowing at high velocities to produce motive thrust or power generation. It is well known in the art that debris may become entrained in the airflow drawn into the engine inlet. Gas turbine engines mounted on aircraft are particularly susceptible to ingestion of ground debris associated with airfield runways during taxi, takeoff and landing. Some of these engines have exhibited rapid performance deterioration and reduced service life caused by airfoil erosion resulting from the abrasion interaction of the debris with the airfoil sections of the engine. Furthermore, if the debris ingested into the engine is comprised of large stones or other objects, engine failure with catastrophic consequences may result from instantaneous damage to the internal parts of the engine.

It is also well known in the art that, while a portion of a performance deterioration is caused by ingestion of airborne particles into the engine, significant performance deterioration results from ingestion of ground debris into the engine caused by a vortex formed between the engine inlet and the ground. More specifically, as described in the prior art the phenomenon of vortex formation attendant to aircraft gas turbine engines is similar to that occurring in nature and known in its more severe form as a tornado and in its less severe form as a dust-devil. The vortex disposed beneath the inlet of a gas turbine engine is fundamentally similar to those aforementioned vortices found in nature except, however, each is caused by different conditions. In nature, the vortex is formed by the interaction of horizontal surface winds with the vertical upflow of warm air rising to a higher less densified strata. With the gas turbine engine, horizontal surface winds coact with the vertical flow of air beneath the engine to form a swirling vortex extending from the engine inlet downward to the runway surface. As with its nature-induced counterpart, the dust-devil, the vortex associated with the gas turbine engine will, upon contact with the ground, remove debris therefrom scattering the debris upward and forward of the engine inlet such that it is entrained in the airflow stream entering the engine inlet.

Prior attempts to obviate vortex-induced ingestion of foreign particles into the engine inlet have been varied and many. One such attempt has been simply to conduct intensive cleanup of airfield runways. This approach, although simple and straightforward, has proved to be expensive due to the rapid accumulation of runway debris and the high cost of cleaning equipment. Another approach utilized screens disposed in or around the engine inlet to filter the air flowing into the engine. This attempt proved unsatisfactory since the screens tended to clog with debris and retard airflow into the engine under normal flight cruising conditions. Retractible screens did not offer acceptable solution to the problem since retraction dislodged the particles from the screen and ingestion into the engine inlet occurred.

Another prior art approach utilized forward blowing air jets positioned to impinge upon the ground in front of the engine inlet to blow away debris. However, this approach blew debris up off the ground and into the airstreams flowing into the engine inlet. Subsequent techniques also utilized an air jet but in a somewhat different manner. One such approach provided for the discharge of pressurized air from a point aft of the engine inlet and in the forward direction to strike and blow away the vortex origination center. Finally, air jets were disposed ahead of the engine inlet to discharge air in the aft direction to create an artificial headwind which opposes the formation of the vortex. Neither of these approaches has proven to be entirely satisfactory. In particular, a boom housing the air jets and disposed ahead of the engine inlet must be provided with anti-icing equipment so as to preclude the formation of ice thereon under flight cruise conditions. Without such equipment, ice breaking away from the boom may be carried into the engine, causing significant damage. The present invention overcomes the deficiencies associated with these prior techniques by providing a novel and more efficient method and apparatus for preventing ingestion of ground debris into the engine inlet.

SUMMARY OF THE INVENTION

It is therefore an object of the present invention to limit ingestion of ground debris into the inlet of gas turbine engines by suppressing the vortex causing such ingestion.

It is another object of the present invention to limit ingestion of ground debris into the inlet of a gas turbine engine by providing a method and apparatus which is more efficient and less expensive than prior art vortex suppression techniques.

These and other objects which will become apparent hereinafter are accomplished by the present invention which, briefly stated, provides a method and apparatus for limiting ingestion of ground debris into a gas turbine engine by suppressing the vortex causing such ingestion. A source of fluid under pressure is provided in fluid communication with first means for introducing at least one jet of fluid at a point aft of the leading edge of a nacelle associated with the engine inlet. The jet of fluid is discharged from the first means away from the leading edge and in the aft direction to establish a low pressure region aft of the leading edge and in sufficient proximity to a second vortex formation region so as to draw air flows from the second region into the low pressure region and away from the engine inlet. The low pressure region may be established either at a magnitude of pressure sufficient to draw the vortex stagnation point into the low pressure region or at a magnitude of pressure sufficient to prevent formation of the vortex. The first means include discharge nozzles which may be disposed in or below the engine nacelle at a distance of no greater than approximately D/2 and preferably no greater than D/4 where D is equal to the diameter of the engine inlet. The nozzles may be circumstantially spaced or axially spaced and may comprise a two-dimensional array of nozzles disposed at different angles.

DESCRIPTION OF THE DRAWINGS

The above and other related objects and features of the present invention will be apparent from a reading of the following description with the accompanying drawings wherein:

FIG. 5 is a schematic representation depicting a gas turbine engine adapted with the present invention wherein the vortex has been completely eliminated.

FIG. 6 is a schematic representation depicting a gas turbine engine adapted with the present invention wherein the vortex has been drawn aft of the engine inlet.

DETAILED DESCRIPTION OF THE PREFERRED EMBODIMENT

Figure 1:
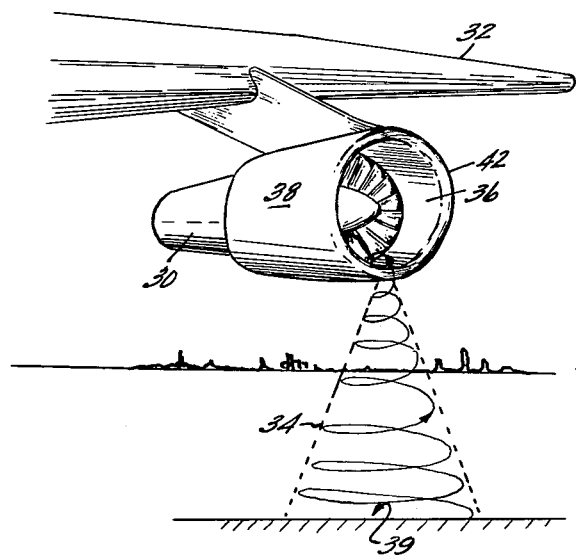
FIG. 1 is a perspective schematic representation of a gas turbine engine mounted on an aircraft wing in proximity to the ground and symbolically depicting a vortex.

Referring now to FIG. 1, a perspective view of a gas turbine engine 30 mounted on an aircraft wing 32 is depicted. As illustrated, under engine operating conditions a swirling airflow field, commonly referred to as a vortex 34, extends from the ground upward to inlet 36 formed by nacelle 38. The vortex 34 includes a stagnation point 39 near the ground disposed remote from the engine inlet which migrates according to ambient wind conditions.

Figure 2:
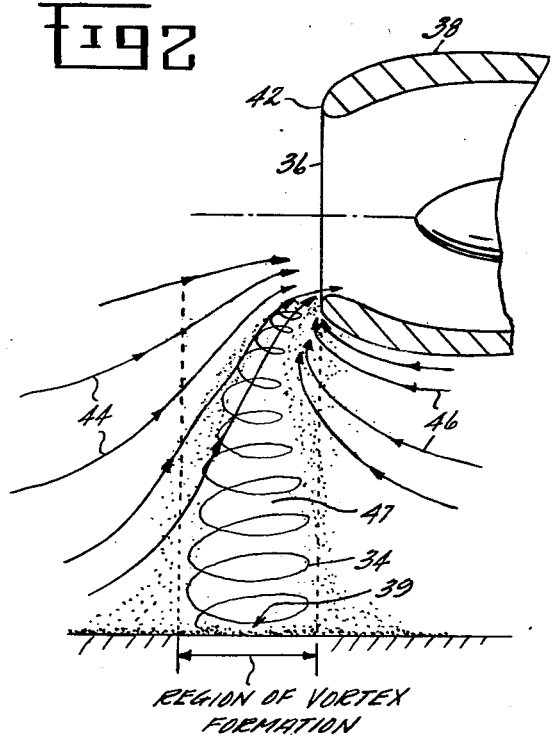
FIG. 2 is a schematic view of the inlet of an aircraft gas turbine engine showing the vortex phenomenon existing with an engine not associated with the present invention.

Referring to FIG. 2, the above-mentioned vortex phenomenon is depicted without association with the present invention. Under operating conditions, engine 30 is supplied with air from both ahead and aft of the circumferentially extending leading edge 42 of nacelle 38. More specifically, engine 30 is supplied with air by an aft flowing primary airstream partially depicted by flow lines 44 disposed ahead of leading edge 42 and further supplied by a forward flowing secondary airstream partially depicted by flow lines 46. Coaction between airstream 44, airstream 46 and atmospheric surface wind creates a region 47, approximately below leading edge 42, in which the formation of vortex 34 is likely to occur and in which vortex 34 resides once it is formed. As earlier stated, the stagnation point 39 of vortex 34 migrates over the ground according to ambient wind velocity and direction. Upon occasion, the stagnation point 39 will touch the ground and cause debris to be lifted into the engine inlet 36. The vortex may cause ingestion of debris by one of two methods: scattering debris upward and into one of the two entering airstreams 44 and 46 or impulsively lifting debris upward in the low pressure vortex core.

Figure 3:
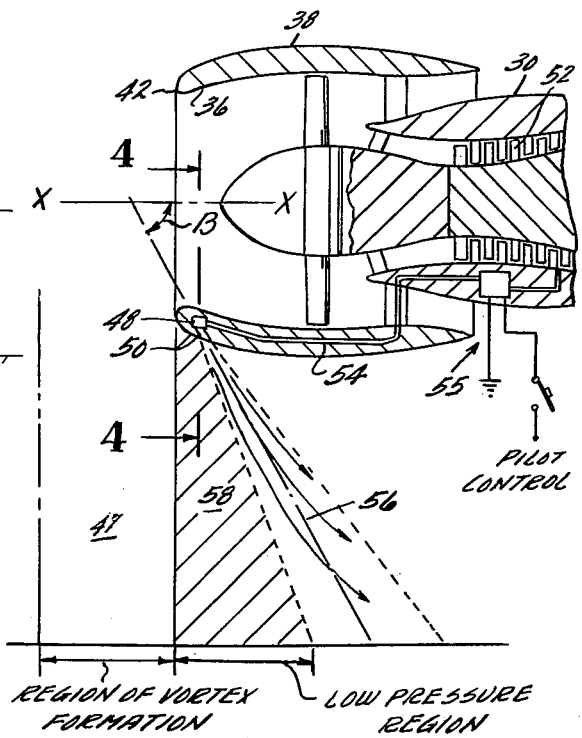
FIG. 3 is a schematic cross-sectional view of the forward portion of a gas turbine engine adapted with the present invention.
Figure 4:
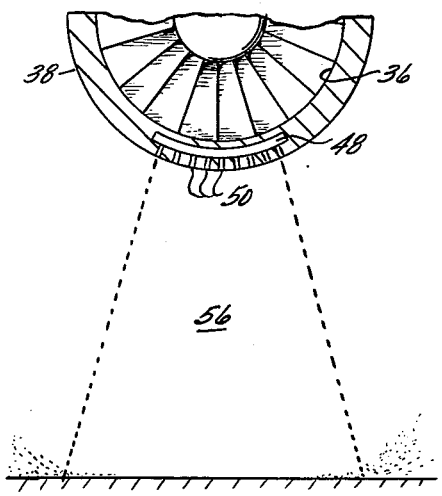
FIG. 4 is a schematic cross-sectional view taken along the line 4—4 in FIG. 3.

FIGS. 3 and 4 depict a schematic view of a gas turbine engine incorporating the present invention. In referring to various engine components and airflows, the numerical designations applied will be the same as those used in FIGS. 1 and 2. More specifically, a fluid distribution manifold 48 is disposed in engine nacelle 38 proximate but aft of leading edge 42 and extends partially, in an arc, around the inlet 38. Depending radially outwardly from manifold 48, a plurality of circumferentially extending spaced apart fluid nozzles 50 is arranged to project downwardly and in the aft direction at an angle B with an imaginary horizontal reference plane X—X. While FIG. 3 depicts the plurality nozzles 50 as only circumferentially spaced, the nozzles may lie arranged so as to be not only circumferentially extending, but also aftwardly extending so as to comprise a two-dimensional array of nozzles. Furthermore, the angle B made by each nozzle with a horizontal plane may vary from the angle B made by other nozzles within the array. Manifold 48 is adapted for fluid communication with a source of fluid under pressure such as compressor 52 associated with gas turbine engine 30 via a fluid carrying conduit 54. Intermediate the compressor 52 and manifold 48 in conduit 54, a control means 55 can be placed to control the supply of fluid to the manifold 48. While the source of fluid under pressure is shown as compressor 52 in FIG. 3, other sources are equally adaptable for fluid communication with manifold 48. More specifically, manifold 48 may be connected to other various pressurized components of gas turbine engine 30 or to a separate pump or to the auxiliary air supplied from the exhaust of an ejector powered by engine bleed air. Furthermore, manifold 48 and fluid nozzles 50 which are depicted within nacelle 38 in FIGS. 3 and 4 may also be disposed exterior to the nacelle 38.

Pressurized fluid, such as air, received by manifold 48 from compressor 52 via conduit 54 and control means 55 is distributed to the plurality of nozzles 50 and ejected away from leading edge 42 in a fluid jet comprising a fan-shaped stream of air depicted by 56 in an aftward and downward direction toward the ground. A low pressure region 58 (shown in cross-hatch in FIGS. 3, 5 and 6) is established immediately forward of fan-shaped airstream but aft of the leading edge 42 of nacelle 38. Low pressure region 58 is established by the tendency of fan-shaped stream 56 to carry air normally occupying region 58 out of region 58 in the aft direction. This phenomenon is due in part to the viscosity-induced interaction between the fan-shaped stream of air 56 and the air occupying region 58 proximate its boundary with fan-shaped stream 56.

Nozzles 50 are disposed in nacelle 38 at a predetermined location and angle such that the low pressure region 58, established ahead of fan-shaped airstream 56, is disposed aft of leading edge 42 and sufficiently proximate to the formation region in which vortex 34 normally resides so as to draw airflows from the vortex formation region into the low pressure region 58 and away from the engine inlet 36. More specifically, this is accomplished by disposing nozzles 50 aft of leading edge 42 at a distance approximately no greater than D/2, and preferably no greater than D/4, where D is equal to the diameter of engine inlet 36. Additionally, the nozzles 50 are further disposed at an angle B approximately between 10° and 45°, and preferably between 20° and 30°, with an imaginary horizontal plane X—X.

With nozzles 50 positioned as described above, low pressure region 58 is established immediately aft of the aforementioned vortex formation and residence region. In such proximity, low pressure region 58 draws airflows from the vortex formation region and as a consequence disturbs the airflow patterns which would otherwise result in the formation of a vortex. The airflow distribution around engine inlet 36 as associated with the present invention is shown in FIG. 5. The portion of aft-flowing airstream 44 which would otherwise contribute to the formation of vortex 34 is drawn out of the vortex formation region 47 into the low pressure region 58 located aft of leading edge 42. The vortex is eliminated since the magnitude of the pressure in the low pressure region is sufficient to draw airflows from the vortex formation region into the low pressure region at a flow rate sufficient to prevent the vortex from being formed or sustained. The remaining portion of aft-flowing airstream enters inlet 36 in the normal manner.

The present invention is also operable to suppress ingestion of foreign debris into the engine inlet when surface winds create air-flow patterns in which it is difficult to eliminate the vortex or prevent its formation. Under these circumstances, the magnitude of pressure in the low pressure region is sufficient to draw the stagnation point 39 of the vortex 34 in the aft direction to a position in the low pressure region which is aft of the leading edge 42 of nacelle 38. In the event vortex 34 touches the ground, most of the particles are ejected upward and entrained in that portion of the airstream 44 which is already aft of the leading edge 42 and flowing in the aft direction. Hence, most of the particles are carried away from the engine inlet and ingestion is reduced. This feature of the present invention is depicted in FIG. 6.

Although only the most preferred embodiments of the present invention have been hereinbefore described, other forms and arrangements are possible which are within the scope of the present invention which are set forth in the appended claims.

We claim:

1. A method of limiting ingestion of ground debris into a gas turbine engine inlet by suppressing the vortex causing said ingestion, said method comprising the steps of:
   providing a source of fluid under pressure;
   providing a two dimensional array of nozzles in fluid communication with said source of fluid under pressure for introducing a plurality of fluid jets at a point aft of the leading edge of a nacelle associated with said engine inlet; and
   discharging said plurality of fluid jets from said array of nozzles away from said leading edge and in the aft direction to establish a low pressure region aft of said leading edge and in sufficient proximity to a vortex formation region so as to draw airflows from said vortex formation region into said low pressure region and away from said engine inlet.

2. The method of claim 1 wherein said step of providing said array of nozzles includes the step of providing at least one fluid nozzle in said array in a nacelle associated with said engine inlet.

3. The method of claim 2 wherein said step of providing said array of nozzles includes providing fluid communication between said array of fluid nozzles and at least one pressurized stage of a compressor associated with said aircraft engine.

4. The method as set forth in claim 2 wherein said step of providing said array of nozzles includes the step of providing said array of nozzles at a distance of no greater than approximately D/4 where D is equal to the diameter of said gas turbine engine inlet.

5. The method as set forth in claim 2 wherein said step of providing said array of nozzles includes providing said array of nozzles at a distance of no greater than approximately D/2 where D is equal to the diameter of said gas turbine engine inlet.

6. The method as set forth in claim 1 wherein said step of providing said array of nozzles includes the step of providing at least one nozzle in said array disposed at an angle with the horizontal plane different than the angle at which at least one other nozzle in said array is disposed with respect to said plane.

7. The method of claim 1 wherein said step of providing said array of nozzles includes the step of providing at least one fluid nozzle below said nacelle and aft of said leading edge.

8. In an aircraft engine having an inlet adapted to receive the flow of air therethrough, an apparatus for limiting ingestion of ground debris into said inlet by suppressing the vortex causing said ingestion, said apparatus comprising:
   a two-dimensional array of nozzles disposed aft of a leading edge of a nacelle associated with said engine, said array of nozzles adapted to provide for the introduction of a plurality of fluid jets at a point aft of the leading edge, said array of nozzles further adapted to discharge said fluid jets away from said leading edge and in the aft direction to establish a low pressure region aft of said leading edge and in sufficient proximity to a vortex formation region so as to draw airflows from said vortex formation region into said low pressure region and away from said engine inlet;
   a source of fluid under pressure; and
   means for providing fluid communication between said array of nozzles and said source of fluid under pressure.

9. An apparatus for limiting ingestion of debris into the inlet of a gas turbine engine said apparatus comprising:
   a source of fluid under pressure;
   a fan duct in which a thrust-producing fan is disposed;
   a circumferentially and axially extending fan duct nacelle surrounding said fan duct, said nacelle being substantially free of circumferentially outwardly extending appendages;
   a plurality of fluid nozzles disposed within said nacelle and aft of a leading edge of said nacelle, said plurality of nozzles circumferentially extending partially about said inlet and adapted to discharge a plurality of fluid jets away from said leading edge and in the aft direction to establish a low pressure region aft of said leading edge and in sufficient proximity to a vortex formation region so as to draw airflows from said vortex formation region into said low pressure region and away from said inlet said plurality of fluid jets being the primary means of inducing said low pressure region, at least one nozzle of said plurality disposed at an angle with a horizontal plane different than the angle at which at least one other nozzle of said plurality is disposed with respect to said plane; and
   means for providing fluid communication between said plurality of fluid nozzles and said source of fluid under pressure.

10. The apparatus as set forth in claim 9 wherein said fluid communication means is comprised of a fluid distribution manifold disposed within said nacelle and communicating said plurality of fluid nozzles with said source of fluid under pressure via a fluid carrying conduit.

11. The apparatus as set forth in claim 10 wherein said nozzles are further disposed at an angle B with respect to an imaginary horizontal plane where B is an angle of not less than 10° nor more than 45°.

12. The apparatus as set forth in claim 11 wherein said nozzles are disposed at an angle B with respect to an imaginary horizontal plane where B is an angle of not less than 20° nor more than 30°.

* * * * *